W. A. Clark,

Meat Tenderer.

No. 113,260.  Patented Apr. 4, 1871.

Witnesses.  William A. Clark.
W. S. Anderson  By A. B. Stoughton, atty.
Edmund Masson.

United States Patent Office.

WILLIAM A. CLARK, OF WOODBRIDGE, CONNECTICUT.

Letters Patent No. 113,260, dated April 4, 1871.

IMPROVEMENT IN DEVICES FOR PREPARING BEEF-STEAK FOR BROILING.

The Schedule referred to in these Letters Patent and making part of the same.

*To all whom it may concern:*

Be it known that I, WILLIAM A. CLARK, of Woodbridge, in the county of New Haven and State of Connecticut, have invented certain new and useful Improvements in Machines for Preparing Beef-Steaks or other Meats for Broiling or Cooking; and that the following is a full, clear, and exact description of the same, reference being had to the accompanying drawing making a part of this specification, in which—

Similar letters of reference, where they occur in the separate figures, denote like parts of the instrument or machine in the drawing.

Figure 1:
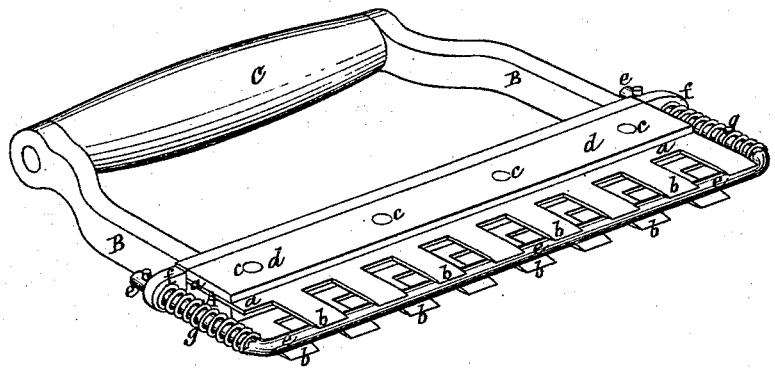
Figure 1 represents in perspective a hand-machine constructed after my invention.

My invention consists in combining with a series of puncturing, abrading, or piercing instruments, for penetrating or bruising the meat, a spring-clearing device that forces the meat from the penetrating instruments as they are withdrawn from it, and so prevents it from adhering to said instruments.

To enable others skilled in the art to make and use my invention, I will proceed to describe the same with reference to the drawing.

Figure 2:
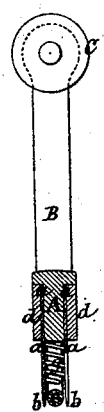
Figure 2 represents a section through the same.

A, figs. 1 and 2, represents a metallic head, to which is clamped or otherwise secured the side plates $a\ a$, which have teeth $b\ b$, &c., upon them.

I have shown the plates $a\ a$ as secured to the head A by means of outside plates, $d\ d$, and through rivets or screws, $c\ c\ c$, which makes a strong and neat connection. Other ways of holding the puncturing instruments to the head or stock of the machine may be used.

To this head is connected side bars B B, united by a handle, C, by which this machine is used.

Between the puncturing-teeth or instruments there is a bar, $e$, which is bent up at its ends, and said bent ends pass through lugs $f\ f$, in which they are guided.

Around these bent ends of the bar are coiled springs $g$, which force the bar $e$ out to, or nearly to, the edges of the puncturers $b$. Other than coiled springs may be used just as readily, and instead of one head and one set of puncturers and clearers there may be two or more sets united to the same handle C.

When the meat to be prepared is struck with this instrument the points or edges $b$ penetrate the same. When the instrument is raised up to repeat the blow the bar $e$ is forced against the meat by the reaction of the springs $g$, and thus prevents it from adhering to the instrument or following it.

Figure 3:
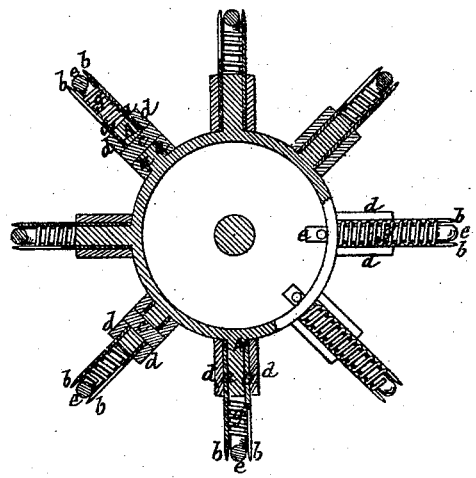
Figure 3 represents the same invention as applied to a revolving head or cylinder.

In fig. 3 the same invention, exactly, is shown as applied to a cylinder, which, instead of being raised up and then brought down upon the meat like that shown in fig. 1, may be rolled over the meat and perform the same duty. Or this series or sets of puncturers and clearers, so arranged upon a cylinder, may be revolved in suitable fixed bearings by a crank or gearing, and the steak or other piece of meat to be made tender by abrasion of its fiber may pass along under the said series or cylinder as it is revolved.

Having thus fully described my invention,

What I claim therein as new, and desire to secure by Letters Patent, is—

In a machine for treating or preparing beef-steaks or other meats for broiling or cooking, the combined use of, or combination of, the series of puncturing or abrading-teeth $b$, the spring-clearer $e$, for preventing the meat from adhering to or following said teeth, and whether arranged to reciprocate or rotate, substantially as herein described and represented.

WM. A. CLARK.

Witnesses:
  A. B. STOUGHTON,
  EDMUND MASSON.